3,736,286
AQUEOUS PIGMENTED ACRYLIC DISPERSION COMPOSITIONS HAVING IMPROVED RHEOLOGY

Joseph David Scott, Philadelphia, and Gabriel L. De Tommaso, Lansdale, Pa., assignors to Rohm and Haas Company, Philadelphia, Pa.
No Drawing. Filed June 30, 1971, Ser. No. 158,524
Int. Cl. C08f 29/46
U.S. Cl. 260—29.6 RW          9 Claims

ABSTRACT OF THE DISCLOSURE

This invention is based on the discovery that an exceptionally good thickening effect is obtained in pigmented coating compositions, including water-base paints, the binder of which is a polymer of predominantly acrylic ester type, by the use of a water-soluble copolymer of N-vinylpyrrolidone (55–95%) and ethyl acrylate (45–5%).

DESCRIPTION OF THE INVENTION

A great variety of coating and paint products based on aqueous dispersions of polyvinyl esters, polyacrylates or polymethacrylates and containing the usual pigments, such as $TiO_2$, zinc oxide or colored pigments, among other, are used for the painting of wood or metal surfaces, the facades of buildings, and even for the fabrication of coated papers. The products based on dispersions of polyvinyl esters, for example, those based on vinyl acetate or propionate, which contain pigments and/or the usual additives flow particularly well when they contain polyvinyl alcohol as a protective colloid.

The painting and coating compositions based on aqueous dispersions of finely dispersed polyacrylates or polymethacrylates, in general flow and level considerably less well than the corresponding products based on dispersions of polyvinyl esters which contain polyvinyl alcohol as a protective colloid. For the purpose of ameliorating this property, thickeners, such as polyvinyl alcohol, cellulose ethers, such as methyl, carboxymethyl, or hydroxyethyl cellulose, and polyacrylates, such as sodium polyacrylate, have been tried (see "Farbe and Locke," 1964, No. 1, pages 29 to 35). By these expedients, water-based polyacrylic ester paints are obtained which flow and level a little better, but such additives do not attain the qualities of flow and leveling that those based on polyvinyl ester dispersions containing polyvinyl alcohol introduced before emulsion polymerization of the vinyl ester.

In general, for this reason, casein has frequently been added to aqueous paints or coating compositions based on aqueous dispersions of alkyl polyacrylates or polymethacrylates (see "Official Digest," vol. 32, No. 424, p. 706). In this fashion, painting and coating compositions are obtained which spread as well as the corresponding products based on polyvinyl ester dispersions, but the casein used is a natural product, the properties of which are subject to variations and, when treated in the usual fashion by alkalies, have a tendency to be decomposed and to be contaminated by microorganisms.

It has been proposed (see Belgian Pat. 727,987) that there be added to paints and coating compositions having a base of aqueous dispersions of polyacrylates or polymethacrylates containing the usual pigments and anionic and/or non-ionic emulsifiers to attain improved flow and leveling properties the following:

(A) An alkali metal or ammonium salt of a ($C_{12}$–$C_{20}$) fatty acid having monoolefinic unsaturation and/or Turkey red oil;

(B) A product of the addition of 20 to 30 moles of ethylene oxide to a ($C_{14}$–$C_{20}$) fatty alcohol having monoolefinic unsaturation; and (C) A homopolymer of N-vinyl pyrrolidone (NVP) or a water-soluble copolymer of NVP and from 10–45% by weight of a vinyl ester, such as vinyl acetate or vinyl propionate, based on the weight of the copolymer, the NVP polymers having K values (determined according to H. Fikentscher, Cellulose Chemie, vol. 13, (1932), page 58) between 60 and 120, particularly between 80 and 100. The proportion of such NVP polymer that was used in the paint or coating composition is in general from 1–5% by weight to the composition.

In accordance with the present invention, it has been discovered that improved flow and leveling can be obtained in aqueous pigmented coating compositions, and especially in water-base paints, which are based on alkyl polyacrylate or polymethacrylate emulsion polymers as the primary binder component by the addition of about 0.1% to 5% by weight, based on the weight of the coating composition, of a water-soluble copolymer of NVP and from 5 to 45% by weight based on copolymer weight, of ethyl acrylate (EA) having a K value of 50 to 130. Preferred copolymers have a K value in the range of 75 to 110. When the NVP/EA copolymers are used for this purpose, it has surprisingly been found unnecessary to add a salt of an olefinically-unsaturated ($C_{12}$–$C_{20}$) fatty acid, such as sodium oleate and a condensate of 20 to 30 moles of ethylene oxide with an olefinically-unsaturated ($C_{14}$–$C_{20}$) fatty alcohol, such as the alcohol obtained from spermaceti oil, as was necessary when NVP/vinyl ester copolymers were added in accordance with Belgian Pat. 727,987.

In addition, the thickeners of the present invention not only show improved flow and leveling as compared to pigmented dispersed acrylic ester polymer compositions made with the conventionally used hydroxyethyl cellulose thickeners when the dispersed polymer particle size is in the range of about 0.35 micron up to about 1 micron, but the new thickened compositions even show some improvement in leveling when the dispersed polymer particle size is as low as 0.1 to 0.3 micron in which range cellulose ether thickeners provide poor rheological properties.

For the preparation of the new coating compositions and paints, one can use aqueous dispersions of typical polyacrylic esters and/or polymethacrylic esters conventionally used for making paints and other coating compositions, which polyacrylates or polymethacrylates are obtained in general from the emulsion polymerization of one or more esters of acrylic acid and/or methacrylic acid with alkanols of 1 to 8 carbon atoms optionally with other comonomers. One preferably uses the polymers obtained from methyl methacrylate, tertiary-butyl acrylate and n-butyl acrylate, isobutyl acrylate, 2-ethylhexyl acrylate and/or ethyl acrylate. The comonomers frequently polymerized in quantities ranging from 10–45% by weight with respect to the copolymer weight are, among others, the vinyl esters, e.g., vinyl acetate or propionate; the vinyl aromatic compounds, e.g., styrene or vinyltoluene; the vinyl halides, such as vinyl chloride and vinylidine chloride; and the nitriles of $\alpha,\beta$-olefinically unsaturated monocarboxylic acids, especially acrylonitrile. One can also use small quantities, for example 1 to 10% by weight of the copolymer, of mono- and dicarboxylic acids having $\alpha,\beta$-monoolefinic unsaturation and having 3 to 5 carbon atoms, such as acrylic acid, methacrylic acid, and maleic acid, as well as their amides, and N-methylol amides.

The aqueous polyacrylate or polymethacrylate dispersions can be prepared in the usual manner, for example, in accordance with the processes described in U.S. Pat. 2,795,564, using the conventional free radical catalysts, such as an alkali metal or ammonium persulfate, with or without the addition of customary emulsifiers, either anionic or non-ionic. The polymer dispersions prepared by emulsion polymerization of the monomers are preferably finely-dispersed and exempt or low in content of protective colloids other than the NVP/EA copolymer that is used. The particle size of the polymer in the dispersion may be from about 0.1 micron to about 1 micron. However, the most surprising improvement in flow and leveling is obtained when the average particle size of the dispersed acrylic polymer is from about 0.35 to 0.55 micron. The content of protective colloids other than the NVP/EA copolymer of the present invention is preferably below 2% by weight. The content of solid acrylic polymer is generally between 40 to 60%.

The usual pigments and additives may be used in the new painting or coating compositions, for example, $TiO_2$, zinc oxide, white lead, calcium carbonate, kaolin, talc, chalk, etc. in the usual quantities. The pigments or fillers are generally present in a proportion between 5 and 60%, preferably between 10 and 40%, by weight, relative to the weight of the painting or coating composition. One can also include the usual quantities of other supplementary additives such as, for example, dispersing agents, softening agents, and antifoaming agents.

The coating and painting products according to the present invention do not present storage problems and they possess excellent flow and leveling behavior in coating and spreading. Their flow and leveling properties are, for example, comparable to those of paints based on polyvinyl ester dispersions which contain polyvinyl alcohol as a protective colloid; they are superior in respect to their resistance to saponification. In comparison with paints based on aqueous dispersions of acrylic ester polymers containing the customarily employed protective colloids, especially hydroxyethyl cellulose which is most widely used, the improved coating compositions of the present invention have good flow and leveling, especially outstanding when the average polymer particle size is about 0.35 to 0.55 micron. They are also much less sensitive to fungal attack than paint products now based on similar binders containing casein.

Pigment compositions used in interior and exterior house paints usually comprise hiding white pigments, other tints and colors ordinarily being obtained by mixing other colored paint pigments with the white pigments. Any of the inorganic and organic pigments, pigment lakes, insoluble dyes and other durable coloring matter ordinarily used in formulating durable exterior paints, varnishes, enamels and lacquers can be used in pigmenting the invention paint compositions. Typical useful white hiding pigments are: rutile titanium dioxide, anatase titanium dioxide, zinc oxide, leaded zinc oxide, zinc sulfide, lead titanate, antimony oxide, zirconium oxide, white lead, basic lead silicate, lithopone, titanated lithopone, titanium-barium pigment, titanium-calcium pigment and titanium-magnesium pigment. The titanium dioxide pigments ordinarily are preferred.

While the indicated pigmentation can be solely of hiding prime pigments, it is economically impractical to use solely prime pigments at the indicated high pigment volume concentration. As is ordinary practice in paint formulation, the total pigment usually consists of hiding prime pigments extended with well-known pigment extenders such as calcium carbonate, gilder's whiting, talc, barytes, magnesium silicates, aluminum silicates, diatomaceous earth, china clay, asbestine, silica and mica. The relative proportions of the prime white pigment and the pigment extender in the pigment mixture may be varied widely, but usually the hiding prime pigment is present at a pigment volume concentration which provides the desired paint covering power or hiding and the extender pigment is present in an amount which provides the paint with the desired total pigment volume concentration. Prime pigments and extender pigments range widely in density, but ordinarily white house paints and light tints thereof have a pigment composition whereof the extender pigment is present in the weight proportion of .4 to 4 parts per part of hiding prime pigment.

Pigments can be dispersed in the aqueous paint vehicle by any of the well-known techniques of pigment dispersion in paint formulation, such as roller milling, ball or pebble grinding, sand grinding as described in Hochberg U.S. Pat. 2,581,414, paddle-mixer dispersion techniques, Werner-Pfleiderer "dough" mixer mixing and other pigment paste techniques. The pigment composition is preferably dispersed in the presence of a water-soluble and swellable colloidal bodying agent and an auxiliary surfactant in addition to the surfactants present to stabilize the polymer dispersions. The auxiliary surfactant for dispersing the pigment composition can be non-ionic, anionic, or cationic, preferably of the water-soluble type. The selection of this dispersing surfactant is judicious to provide compatibility and non-reactivity with the polymer dispersion stabilizing surfactants. The surfactant for dispersing the pigment composition may be same or different from the stabilizing surfactants of the polymer. Ordinarily a concentration of up to 2% of the auxiliary pigment-dispersing surfactant based on the weight of the pigment composition is adequate, the preferred concentration being 0.1% to 1% on the indicated basis. It is preferred that the total amount of pigment dispersing surfactant and the polymer stabilizing surfactants does not exceed 10% based on the total weight of polymer solids.

The rheological characteristics of the paint can be varied to suit the application needs. The presence of combined carboxylic acid units in the acrylic ester copolymers are helpful in altering the rheological characteristics, particularly when carboxylic substituents are reacted with ammonium hydroxide to form the ammonium carboxylate of the ester copolymer. The aqueous dispersion paint ordinarily is adjusted to an alkaline state of 7.5 to 10 pH with ammonium hydroxide.

Another desirable ancillary component which is preferentially present in the aqueous dispersion paint composition is a volatile water-soluble organic anti-freeze agent to provide the aqueous paint with freeze-thaw stability. Ethylene glycol is especially useful for this purpose at concentrations up to about 5% by weight of the total composition. Other glycols and polyglycols can be used for this purpose.

Aqueous dispersion paint compositions containing surfactants ordinarily foam unless selection of the dispersants is specifically directed to the inherently non-foaming species. Anti-foam agents are ordinarily included in the aqueous paint formulation to minimize foaming. High boiling alcohols, polyglycols, silicone liquids and other anti-foam agents well-known to the coating art can be included in the composition as an ancillary component.

As with conventional paints and enamels formulated from drying oils and from alkyd resins, the paints coalesced from the invention composition may exhibit fungus attack and, therefore, it is further desirable to include a preservative or fungicidal agent in the paint. Any of the well-known preservative agents used in paint formulations can be used in their usual small effective proportions. Phenyl mercury oleate and other phenyl mercurial fungicides are especially useful at active concentrations from 0.05 to 0.3% by weight of the composition.

The paint compositions of this invention ordinarily are adequately flexible that the external plasticization of the polymer polyblend is unnecessary. However, ancillary plasticizer can be included in the composition in a minor proportion up to 10% by weight of the polymer, preferably no more than 5%. Non-volatile ester plasticizers, for example, the phosphates, such as tricresyl phosphate, and the phthalates, such as dibutyl phthalate, or the polymeric polyester or alkyld plasticizers can be used.

While the total non-volatile content of the aqueous dispersion paint composition, ordinarily designated as the solids content, can vary widely, it is desirable that the non-volatile content be at least 30% by weight in order that a practical amount of paint per coat is applied. The aqueous paint can be satisfactorily formulated in a non-volatile content as great as 70%, but at this concentration thinning with water is ordinarily necessary for satisfactory application. The preferred non-volatile content is from about 40% to 60% by weight.

The viscosity of the aqueous dispersion paint composition also can be varied widely. A stormer viscosity of about 70 to 100 K.U. at 25° C. is a desirable ready-to-apply brush consistency. This is not a critical characteristic as the paint can be further modified satisfactorily with thixotropy-controlling agents to provide the composition with non-drip characteristics with adequate brushout characteristics.

In making water-base paints, the preferred formulations generally fall within the scope of the following tabulation, wherein the percentages indicate the solids content.

| Material: | Percent by weight |
| --- | --- |
| Aqueous dispersed acrylic ester polymer | 10–30 |
| Pigment composition | 15–55 |
| Stabilizing and dispersing surfactants | 0.1–2.5 |
| Bodying or rheology control agent-NVP/EA copolymer | 0.1–5.0 |
| Anti-freeze agent, e.g. ethylene glycol | 0–5 |
| Anti-foam agent, e.g. polypropylene glycol | 0–2 |
| Fungicidal preservative, e.g. phenyl mercurial salt | 0–1.0 |
| Ammonium hydroxide, to pH value 7.5 to 10. | |
| Water, balance to make 100. | |

The pigment volume concentration is preferably from 15% to 65%. The total of the dispersing and stabilizing surfactants is an amount no greater than 10% based on the weight of the dispersed water-insoluble acrylic ester polymer.

The new compositions are interesting above all for the preparation of so-called "satin" paints and high-gloss paints. They are, on the other hand, useful for coating paper, textile products, and leather.

The flow and leveling characteristics of the coating compositions can be determined by the use of an apparatus having a helical coil of a fine wire (0.5 mm. diameter) in which adjacent coils are spaced apart by 2 mm. A liquid film of the paint product is spread over a glass plate to a thickness of any desired number of microns, such as 5 microns. The helical wire coil is passed through the coating and has the same action as a painting brush with the difference that the interval between the bristles (which are in this case the turns of the helix) is well defined. The striations formed by the helix in the paint film will remain visible, or disappear during the drying, e.g., 30 minutes at 25° C., according to the "flow and leveling" characteristics of the paint. The designation of the best flow and leveling is by the numeral "1" which designates the situation where the striations completely disappear on drying, the value 2 is given in the case where 70% of the striations disappear on drying, the value 3 when only 30% of the striations disappear and the value 4 designates that all of the striations remain apparent on drying. The spreading value 1 then corresponds to an excellent capacity for flow and leveling of the paint product, the value 4 corresponds to a very poor capacity of spreading.

The parts and percentages in the examples following are by weight unless otherwise specifically designated.

EXAMPLE 1

To 100 parts of an aqueous dispersion (pH 7.5–9) of 50% of an emulsion copolymer of 47% n-butyl acrylate (BA), 49% styrene (S), 2.5% methyl methacrylate (MMA), and 2.5% acrylamide (AM) prepared in conventional manner, using as an emulsifier 0.1 part of a condensation product of 40 mols of ethylene oxide and 1 mol of tert-octylphenol, and having an average particle size of about 0.4 micron, there is added 10 parts of an aqueous solution containing 30% of a copolymer of 80 parts NVP and 20 parts ethyl acrylate (EA), having a K value of 84. The resulting dispersion is formulated with a pigment dispersion to form a paint. After a thorough homogenization, one obtains a stable paint product, easy to store, suitable for high gloss paints and which possesses excellent flow and leveling as indicated by a helical wire test of 1.

Comparative Example (a).—Example 1 is repeated, but the NVP/EA copolymer is omitted. The paint product thus obtained has a spreading value of 1, but paint viscosity is too low.

Comparative Example (b).—Example 1 is repeated, but the NVP/EA copolymer is replaced by a corresponding amount of hydroxyethyl cellulose. The paint obtained has a spreading value of 2–3.

EXAMPLE 2

30 parts of an aqueous dispersion containing 50% of a copolymer of 49% n-butyl acrylate, 48% styrene, 1.5% acrylic acid, and 1.5% methacrylamide, having an average particle size of 0.3 micron and prepared by emulsion copolymerization, using a persulfate initiator but less than 0.1%, based on monomers, of the emulsifier used in Example 1 is mixed with 61 parts of water containing 0.1 part NaOH; there is then added 100 parts kaolin, 0.3 part of sodium polyacrylate (dispersing agent) and 10 parts of 30% aqueous solution of a copolymer of 70 parts of NVP and 30 parts of ethyl acrylate having a K value of 107. After a homogenization effected within the mixture at high velocity, there is obtained a very fluid mass, particularly well suited to the coating of paper. The spreading value is 1–2.

Comparative Example (c).—Following the mode of operation of Example 2, but replacing the solution of the NVP/EA copolymer by 20 parts of a solution of 2% methyl cellulose one obtains a lumpy coating composition having a spreading value of 4.

EXAMPLE 3

100 parts of an aqueous dispersion containing 46% of a copolymer of 27% MMA, 20% vinyl acetate, and 53% EA, having an average particle size of 0.3 micron, prepared by emulsion copolymerization by the process of Example 1(d) of U.S. Pat. 3,083,172 is mixed with 0.5 part of 1.0 N solution of NaOH, and 75 parts of a mixture of 50 parts of rutile, 15 parts of a solution containing 2% sodium polyphosphate and 10 parts of a solution containing 30% of a copolymer of 65 parts of NVP and 35 parts of EA having a K value of 108. One then adds 0.5 part of a commercial silicone antifoaming agent. After powerful homogenization, there is obtained a paint that is easy to store and suitable for formulation of high-gloss paints having a spreading value of 1.

Comparative Example (d).—Example 3 is repeated replacing the 10 parts of NVP copolymer solution either (a) by 20 parts of an aqueous solution containing 2% of methyl cellulose,
(b) by 25 parts of an aqueous solution containing 4% of hydroxyethyl cellulose, or
(c) by 10 parts of an aqueous solution containing 8% ammonium polyacrylate;

one obtains within each case a paint having a spreading value of 2–3.

EXAMPLE 4

Two interior paint compositions A and B are prepared by grinding for about 15 minutes, in a Cowles dissolver, a mixture of the first four materials listed in the following table and then letting the mixture down with the remaining ingredients with suitable agitation:

| Paint | Pounds | |
|---|---|---|
| | A | B |
| Grind: | | |
| Sodium salt of 1:1 mol ratio diisobutylene/maleic anhydride copolymer | 11.0 | 11.0 |
| Defoamer | 2.0 | 2.0 |
| Propylene glycol | 67.0 | 67.0 |
| TiO₂ | 275.0 | 275.0 |
| Letdown: | | |
| Propylene glycol | 85.5 | 85.5 |
| Aqueous dispersion of ammonium salt of an emulsion copolymer of 37.5% ethyl acrylate, 4.5% butyl acrylate, 56% methyl methacrylate, and about 2% methacrylic acid (46.5%) ¹ | 590.5 | 590.5 |
| Defoamer | 4.0 | 4.0 |
| Phenyl mercuric succinate | 1.0 | 1.0 |
| Butyl Cellosolve | 27.5 | 27.5 |
| Dicapryl sodium sulfosuccinate | 2.0 | 2.0 |
| Hydroxyethyl cellulose (Cellosize QP-4400) (2.5%) | | 40.0 |
| Copolymer of 20% ethyl acrylate and 80% N-vinyl-pyrrolidinones (15%) | 34.0 | |
| Water | 28.4 | 22.4 |

¹ Particle size 90% .35 micron±.04; 10% .16 micron.

The viscosity and flow characteristics and content of thickener of the paints are as follows:

| Paint | A | B |
|---|---|---|
| Initial Krebs Units (KU) | 68 | 68 |
| Equilibrated KU | 72 | 77 |
| ICI viscosity | 1.45 | 1.05 |
| Flow and leveling by brush application | VG+ | G |
| Dry thickener, lbs./100 gal | 5.1 | 1.0 |

We claim:

1. A pigmented coating composition based on an aqueous emulsion of a polymer of one or more esters of acrylic acid and/or methacrylic acid with alkanols of 1 to 8 carbon atoms containing a pigment or pigments in conventional amount and one or more emulsifier(s), either anionic and/or non-ionic in conventional amount, characterized in that it contains, as a thickener, from 0.1% to 5%, by weight, based on the total weight of the composition, of a water-soluble copolymer of 55 to 95% by weight of N-vinylpyrrolidone and 45 to 5% by weight, respectively, of ethyl acrylate.

2. A composition in accordance with claim 1 in which the amount of pigment is from about 5 to 60% by weight, based on the weight of the coating composition.

3. A composition in accordance with claim 1 in which the water-soluble copolymer has a K value of 50 to 130.

4. A composition in accordance with claim 2 in which the water-soluble copolymer has a K value of 50 to 130.

5. A composition in accordance with claim 1 in which the water-soluble copolymer has a K value of 75 to 110.

6. A composition in accordance with claim 2 in which the water-soluble copolymer has a K value of 75 to 110.

7. A composition in accordance with claim 1 in which the amount of pigment is from about 10 to 40% by weight, based on the weight of the coating composition.

8. A composition in accordance with claim 7 in which the water-soluble copolymer has a K value of 50 to 130.

9. A composition in accordance with claim 7 in which the water-soluble copolymer has a K value of 75 to 110.

References Cited

UNITED STATES PATENTS 3,594,336   7/1971   Bergmeister et al. ____ 260—17

FOREIGN PATENTS 947,665   1/1964   Great Britain __ 260—29.6 RW
1,095,410   12/1967   Great Britain __ 260—29.6 RW
1,101,884   1/1968   Great Britain __ 260—29.6 RW

OTHER REFERENCES

Chem. Abstracts 68, 22530d (1968).

WILLIAM SHORT, Primary Examiner

E. A. NIELSEN, Assistant Examiner

U.S. Cl. X.R.

117—161 UN; 260—29.6 WB